(12) United States Patent
Kim et al.

(10) Patent No.: US 7,535,679 B2
(45) Date of Patent: *May 19, 2009

(54) DISK DRIVE ACTUATOR LATCH APPARATUS HAVING ELASTIC DAMPING ARM

(75) Inventors: Tae-soo Kim, Suwon-si (KR); Joseph Chang, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 250 days.

This patent is subject to a terminal disclaimer.

(21) Appl. No.: 11/059,379

(22) Filed: Feb. 17, 2005

(65) Prior Publication Data

US 2005/0180055 A1    Aug. 18, 2005

(30) Foreign Application Priority Data

Feb. 17, 2004    (KR) .................. 10-2004-0010421

(51) Int. Cl.
 G11B 21/22    (2006.01)
 G11B 5/54    (2006.01)
(52) U.S. Cl. ................. 360/256.2; 360/256.4
(58) Field of Classification Search .............. 360/256.2, 360/256.4
 See application file for complete search history.

(56) References Cited

U.S. PATENT DOCUMENTS

| | | | |
|---|---|---|---|
| 4,985,793 A | 1/1991 | Anderson | |
| 5,341,259 A | 8/1994 | Amirkiai et al. | |
| 5,448,436 A | 9/1995 | Albrecht | |
| 6,381,102 B1 * | 4/2002 | Strom et al. | 360/256 |
| 6,542,335 B1 | 4/2003 | Misso et al. | |
| 7,259,938 B2 * | 8/2007 | Lee et al. | 360/256 |
| 7,286,327 B2 * | 10/2007 | Jeong | 360/256.2 |
| 2002/0135944 A1 | 9/2002 | Misso | |

(Continued)

FOREIGN PATENT DOCUMENTS

CN    1129889 A    8/1996

(Continued)

OTHER PUBLICATIONS

Chinese Office Action for corresponding Chinese Patent Application No. 2005100093435 dated Mar. 28, 2008 (5 pgs).

(Continued)

*Primary Examiner*—Craig A Renner
(74) *Attorney, Agent, or Firm*—Staas & Halsey LLP

(57) ABSTRACT

An actuator latch apparatus for a disk drive, having a notch positioned at a first end portion of the swing arm, a latch lever rotatably installed in a base member, a first core provided on a second end portion of the swing arm, and a second core provided at a counterbalance of the latch lever. The first and second cores apply a torque to the swing arm and latch lever, respectively, in a first direction by a magnetic force of the magnet. The latch lever has a latch pivot, a latch arm provided at a first side of the latch pivot and having a hook to be caught by the notch when the actuator is locked, and the counterbalance provided on a second side of the latch pivot. The latch arm of the latch lever is elastically deformed when contacted by the swing arm during parking of the head.

28 Claims, 10 Drawing Sheets

U.S. PATENT DOCUMENTS

2002/0149882 A1* 10/2002 Williams et al. ............ 360/256
2004/0257709 A1* 12/2004 Lee et al. ..................... 360/256
2005/0152069 A1* 7/2005 Jeong ...................... 360/256.2

FOREIGN PATENT DOCUMENTS

| EP | 0 834 870 | 4/1998 |
| JP | 07-262716 | 10/1995 |
| JP | 2002-319259 | 10/2002 |
| KR | 96-15446 | 5/1996 |
| KR | 98-4782 | 3/1998 |
| KR | 000020326 | 4/2000 |

OTHER PUBLICATIONS

Korean Office Action issued Nov. 18, 2005.
European Search Report For Application No. 05002831.5-1239- dated Jun. 15, 2005.

* cited by examiner

PRESENT INVENTION

PRIOR ART

DISK DRIVE ACTUATOR LATCH APPARATUS HAVING ELASTIC DAMPING ARM

CROSS-REFERENCE TO RELATED APPLICATIONS

This application claims the priority of Korean Patent Application No. 2004-10421, filed on Feb. 17, 2004, in the Korean Intellectual Property Office, the disclosure of which is incorporated herein by reference.

BACKGROUND OF THE INVENTION

1. Field of the Invention

The present invention relates to a disk drive, and more particularly, to an actuator latch system for a disk drive, in which an actuator is locked in a predetermined position when a disk is not rotating, such that the actuator is prevented from arbitrarily rotating due to an impact.

2. Description of the Related Art

As a data storage device of a computer, a hard disk drive (HDD) is a device for reproducing/recording data from/on a disk using a read/write head. In such an HDD, a head moves to a desired position by motion of an actuator, while being lifted above a recording surface of a rotating disk, and executes the reproducing/recording functions.

Meanwhile, if the HDD does not operate, that is, if the disk is not rotating, the head is parked off the recording surface of the disk to prevent a collision with the recording surface of the disk. Such head parking systems can be classified into a contact start-stop (CSS) system and a ramp loading system. In the CSS system, a parking zone, in which data is non-recordable, is provided in an inner circumference of the disk and the head is parked in contact with the parking zone. In the ramp loading system, the head is parked on a ramp, which is installed outside the disk.

In a state with the head parked on the parking zone or the ramp, the actuator may arbitrarily rotate due to an impact or vibration, such that the head is forced out of the parking zone or the ramp and onto the recording surface of the disk. In this case, the head makes contact with the recording surface of the disk, such that the head and/or the recording surface may be damaged. Therefore, when the head is parked on the parking zone or the ramp, the actuator must be locked to a predetermined position so that it cannot rotate arbitrarily. For this purpose, various kinds of actuator latch systems are provided in the HDD.

FIG. 1 illustrates a prior art actuator latch apparatus for a HDD, which is disclosed in U.S. Pat. No. 5,448,436.

Referring to FIG. 1, an HDD includes an actuator 20 to move a read/write head to a predetermined position on the disk. The actuator 20 includes a swing arm 22 rotatably mounted on a pivot 21, which is installed in a base member 10, and a suspension 23 installed in one end portion of the swing arm 22 to elastically bias the slider 24 toward a surface of the disk 14. A head is mounted on the slider 24.

The HDD further includes an inertial latch apparatus 50 that locks the actuator 20 when the head is parked in a ramp 30. The inertial latch apparatus 50 includes a latch arm 51 rotating due to an inertia, a latch hook 52 installed on a front end of the latch arm 51, a notch 27 provided at a rear end of the swing arm 22, a crash stop 40 limiting a clockwise rotation of the swing arm 22, and a latch stop 53 limiting a clockwise rotation of the latch arm 51.

In the inertial latch apparatus 50, if a rotational force impacts the HDD in a clockwise direction, the swing arm 22 and the latch arm 51 rotate in a counterclockwise direction due to inertia. Thus, the latch hook 52 is caught by the notch 27, such that the swing arm 22 cannot rotate further.

On the other hand, if a rotational force impacts the HDD in a counterclockwise direction, the swing arm 22 and the latch arm 51 rotate in a clockwise direction due to inertia. At first, the swing arm 22 rotates in a clockwise direction, but it collides with the crash stop 40 and rebounds from the crash stop 40, resulting in the swing arm 22 rotating in a counterclockwise direction. The latch arm 51 collides with the latch stop 53 and rebounds from the latch stop 53, resulting in the latch arm 51 rotating in a counterclockwise direction. Since the swing arm 22 and the latch arm 51 rotate in the counterclockwise direction due to the rebound, the latch hook 52 is engaged with the notch 27, thereby locking the actuator 20. An O-ring 41 is installed in the crash stop 40 which makes the swing arm 22 rebound easily. Also, an O-ring 57 is installed in the latch stop 53 and the latch arm 51 is made of elastic material, thus making the latch arm 51 rebound easily.

The inertial latch apparatus 50 operates by a relatively strong rotational impact force which results in the rotation of the latch arm 51. If a relatively weak rotational impact force is applied the HDD, the latch arm 51 does not rotate, and thus the actuator 20 is not locked. As a result, the actuator 20 rotates arbitrarily. In other words, when a relatively weak impact force is applied, the inertial latch apparatus 50 has a drawback in that a locking reliability of the actuator 20 cannot be guaranteed.

FIGS. 2A and 2B illustrate an improvement of the prior art actuator latch apparatus.

Referring to FIG. 2A, an actuator 60 includes a voice coil motor (VCM) rotating a swing arm 62. The VCM includes a VCM coil 67 coupled to a rear end portion of the swing arm 62, and a magnet 68 arranged to face the VCM coil 67. The magnet 68 is supported by a yoke 69.

An actuator latch apparatus 80 of FIGS. 2A and 2B has a structure that can lock the actuator 60 using a magnetic force of the magnet 68 as well as inertia. The actuator latch apparatus 80 includes a notch 81, which is provided at an end portion of the swing arm 62, and a latch lever 83, which may rotate around a latch pivot 84. A first core 82 is provided at a rear end portion of the swing arm 62, such that a magnetic force acts between the first core 82 and the swing arm 62. The first core 82 generates a torque that causes the swing arm 62 to rotate in a clockwise direction by a magnetic force of the magnet 68. The latch lever 83 has a hook 85 at a first end portion and a second core 86 at a second end portion. The hook 85 is caught by the notch 81, and a magnetic force acts between the second core 86 and the magnet 68. The second core 86 generates a torque to rotate the latch lever 83 in a clockwise direction due to a magnetic force of the magnet 68. A clockwise angular displacement of the latch lever 83 is limited by a latch stop 89.

An operation of the latch apparatus 80 will now be described. When a head mounted on a slider 64 is parked on a ramp 70, the VCM rotates the swing arm 62 around a pivot 61 in a clockwise direction. A rear portion of the swing arm 62 is in contact with a protrusion 88, which is provided at the other end portion of the latch lever 83. Thus, the latch lever 83 rotates in a counterclockwise direction. While the latch lever 83 rotates in a counterclockwise direction, if a protrusion 87 provided at the first end portion of the latch lever 83 is in contact with the swing arm 62, the clockwise rotation of the swing arm 62 is stopped, as is the counterclockwise rotation of the latch lever 83. In this manner, the latch lever 83 also acts as a crash stop to limit the clockwise angular displacement of the swing arm 62. As is shown in FIG. 2A, parking of the head is completed and the latch apparatus 80 locks the actuator 60 simultaneously. At this point, the magnetic force acting between the first core 82 and the magnet 68 is set to be greater than that acting between the second core 86 and the magnet 68, such that the locking state of the actuator 60 is maintained.

If a clockwise rotational impact force is greater than the magnetic force existing between the first core 82 and the magnet 68, and is applied to the HDD when the head is in the parked state, the swing arm 62 and the latch lever 83 rotate in the counterclockwise direction due to inertia. Thus, the hook 85 of the latch lever 83 is caught by the notch 81, such that the swing arm 62 cannot rotate further.

On the other hand, if a counterclockwise rotational impact force is applied to the HDD, clockwise inertia acts between the swing arm 62 and the latch lever 83. Accordingly, the swing arm 62 and the latch lever 83 collide with each other and then rebound, such that both the swing arm 62 and the latch lever 83 rotate in a counterclockwise direction. As is shown in FIG. 2A, since the swing arm 62 and the latch lever 83 are in contact with each other, the counterclockwise torque of the swing arm 62 due to the rebound is weak. Therefore, the counterclockwise rotation of the swing arm 62 does not occur, due to the magnetic force acting between the first core 82 and the magnet 68.

If a rotational impact force is less than the magnetic force between the first core 82 and the magnet 68, and is applied to the HDD, the rotation of the swing arm 62 does not occur due to the magnetic force.

In this manner, the actuator latch apparatus 80 uses the magnetic force and inertia in combination, so that the actuator 60 is reliably locked in the event of a relatively weak impact and vibration as well as a strong impact.

Referring to FIG. 2B, when the HDD operates, the head must move from the ramp 70 to the recording surface of the disk. For this, the locking state of the actuator 60 must be released. If power is supplied to the VCM coil 67, the swing arm 62 rotates in a counterclockwise direction with a resistance to the magnetic force of the magnet 68 acting on the first core 82 of the swing arm 62. Simultaneously, the latch lever 83 rotates in a clockwise direction due to the magnetic force of the magnet 68 acting on the second core 86, such that the notch 81 of the swing arm 62 does not interfere with the hook 85 of the latch lever 83.

In the actuator latch apparatus 80, when the swing arm 62 rotates in a clockwise direction to park the head in the ramp 70, the swing arm 62 contacts with the protrusions 87 and 88 of the latch lever 83. At this time, a large impact force is applied to the protrusions 87 and 88 of the latch lever 83. Such an impact produces great noises. Also, the impact force is transferred to the head through the swing arm 62, such that the head may be damaged or read/write performance may be degraded. Due to the impact, the protrusions 87 and 88 of the latch lever 83 are abraded, thus generating particles. These particles cause the head and the disc surface to be contaminated or damaged.

SUMMARY OF THE INVENTION

The present invention provides an actuator latch apparatus for an HDD that can reduce a force of an impact that occurs between a swing arm and a latch lever in a parking of a head, and reduce an accompanying noise.

According to an aspect of the present invention, there is provided an actuator latch apparatus to lock and unlock an actuator in a disk drive, to maintain a read/write head in a parking zone when the disk drive is stopped, the disk drive having the actuator including a swing arm rotatably mounted on a base member, a VCM coil coupled to one end portion of the swing arm, and a magnet arranged to face the VCM coil, the actuator latch apparatus comprising: a notch positioned at one end portion of the swing arm; a latch lever rotatably installed in the base member, the latch lever including a latch pivot, a latch arm that is provided at a first side of the latch pivot and has a hook to be caught by the notch when the actuator is locked, and a counterbalance provided at a second side of the latch pivot; a first core provided at a first end portion of the swing arm to apply a torque to the swing arm in a first direction by a magnetic force of the magnet; and a second core provided at the counterbalance of the latch lever to apply a torque to the latch lever in the first direction by a magnetic force of the magnet, wherein the latch arm of the latch lever is elastically deformed elastically when contacted by the swing arm during parking of the head, the swing arm rotating in the first direction when the head is parked, such that an impact due to a contact with the swing arm is reduced.

According to one aspect, the latch arm is made of an elastic material. According to one aspect, the latch arm is sufficiently thin so as to be bent due to contact with the swing arm during parking of the head.

According to one aspect, the latch arm includes a first protrusion protruding toward the swing arm to contact with a first side surface of the swing arm, and the counterbalance includes a second protrusion protruding toward the swing arm to contact with a second side surface of the swing arm.

According to one aspect the second protrusion is made of a visco-elastic material and a portion of the second protrusion is insertedly coupled with the counterbalance. According to one aspect, a width of the portion insertedly coupled with the counterbalance is greater than that of a portion protruded from the counterbalance.

According to another aspect of the present invention, there is provided an actuator latch apparatus to lock and unlock an actuator in a disk drive, to maintain a read/write head in a parking zone when the disk drive is stopped, the disk drive having the actuator including a swing arm rotatably mounted on a base member, a VCM coil coupled to one end portion of the swing arm, and a magnet arranged to face the VCM coil, the actuator latch apparatus comprising: a notch positioned at one end portion of the swing arm; a latch lever rotatably installed in the base member, the latch lever including a latch pivot, a latch arm that is provided at a first side of the latch pivot and has a hook to be caught by the notch when the actuator is locked, a counterbalance provided at a second side of the latch pivot, and a damping arm protruding from a portion between the latch arm and the counterbalance; a first core provided at a first end portion of the swing arm to apply a torque to the swing arm in a first direction by a magnetic force of the magnet; and a second core provided at the counterbalance of the latch lever to apply a torque to the latch lever in the first direction by a magnetic force of the magnet, wherein the damping arm of the latch lever is elastically deformed elastically when contacted by the swing arm during parking of the head, the swing arm rotating in the first direction when the head is parked, such that an impact due to a contact with the swing arm is reduced.

According to one aspect, the damping arm is made an elastic material. According to one aspect, the damping arm is sufficiently thin so as to be bent due to contact with the swing arm.

According to one aspect, the latch arm includes a first protrusion protruding toward the swing arm to contact with a first side surface of the swing arm, and the damping arm includes a second protrusion protruding toward the swing arm to contact with a second side surface of the swing arm.

According to one aspect, the first protrusion, the second protrusion and the damping arm are made of a visco-elastic material, the first protrusion is insertedly coupled to the latch arm, and the second protrusion and the damping arm are integrally formed. According to one aspect, the latch pivot is made of a visco-elastic material and is formed integrally with the damping arm. According to one aspect, the latch arm further includes a supporter supporting the first protrusion, and the supporter is formed integrally with the first protrusion and elongated in a length direction.

According to a further aspect of the present invention, there is provided an actuator latch apparatus to lock and unlock an actuator in a disk drive, to maintain a read/write head in a parking zone when the disk drive is stopped, the disk drive having the actuator including a swing arm rotatably mounted on a base member, a VCM coil coupled to one end portion of the swing arm, and a magnet arranged to face the VCM coil, the actuator latch apparatus comprising: a notch positioned at one end portion of the swing arm; a latch lever rotatably installed in the base member, the latch lever including a latch pivot, a latch arm that is provided at a first side of the latch pivot and has a hook to be caught by the notch when the actuator is locked, a counterbalance provided at a second side of the latch pivot, and a damping arm protruding from a portion between the latch arm and the counterbalance; a first core provided at a first end portion of the swing arm to apply a torque to the swing arm in a first direction by a magnetic force of the magnet; and a second core provided at the counterbalance of the latch lever to apply a torque to the latch lever in the first direction by a magnetic force of the magnet, wherein the latch arm and the damping arm are respectively deformed elastically when respectively contacted by first and second side surfaces of the swing arm during parking of the head, the swing arm rotating in the first direction when the head is parked, such that an impact due to a contact with the swing arm is reduced.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
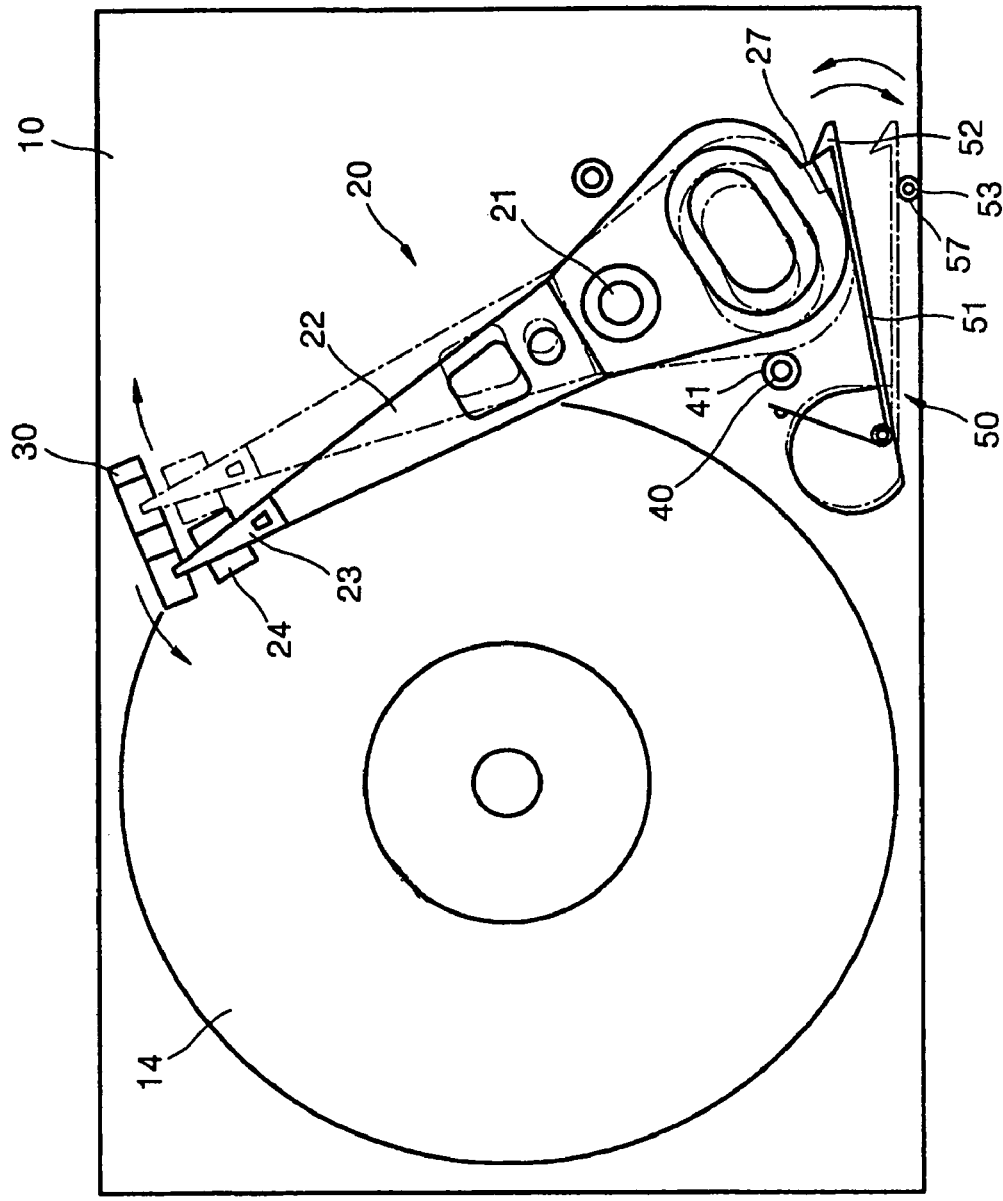
FIG. 1 shows an example of a prior art actuator latch apparatus for an HDD.

Reference will now be made in detail to embodiments of the present invention, examples of which are illustrated in the accompanying drawings, wherein like reference numerals refer to the like elements throughout. The embodiments are described to explain the present invention by referring to the figures.

Figure 3:
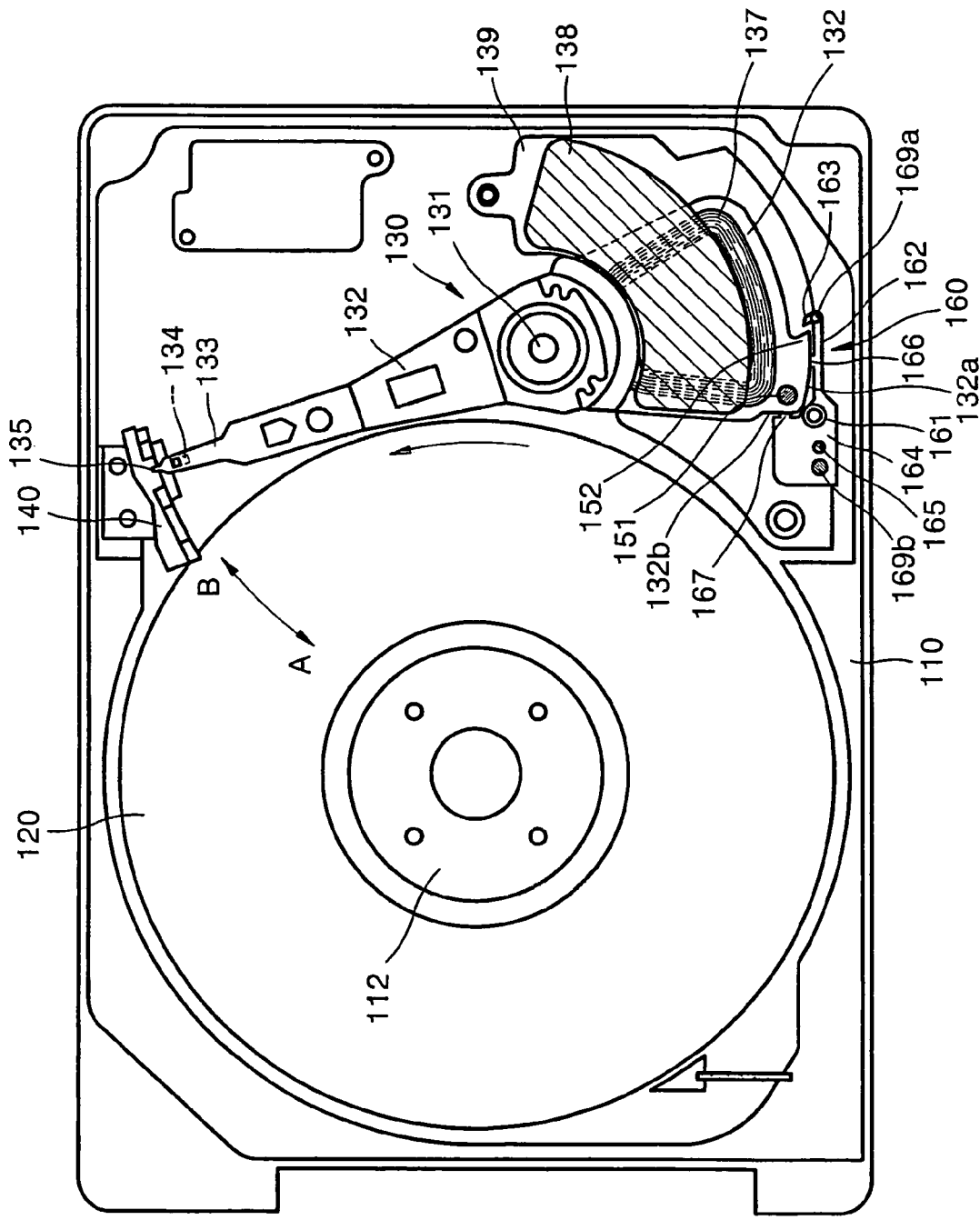
FIG. 3 is a plan view of a disk drive having an actuator latch apparatus according to an embodiment of the present invention.
Figure 4:
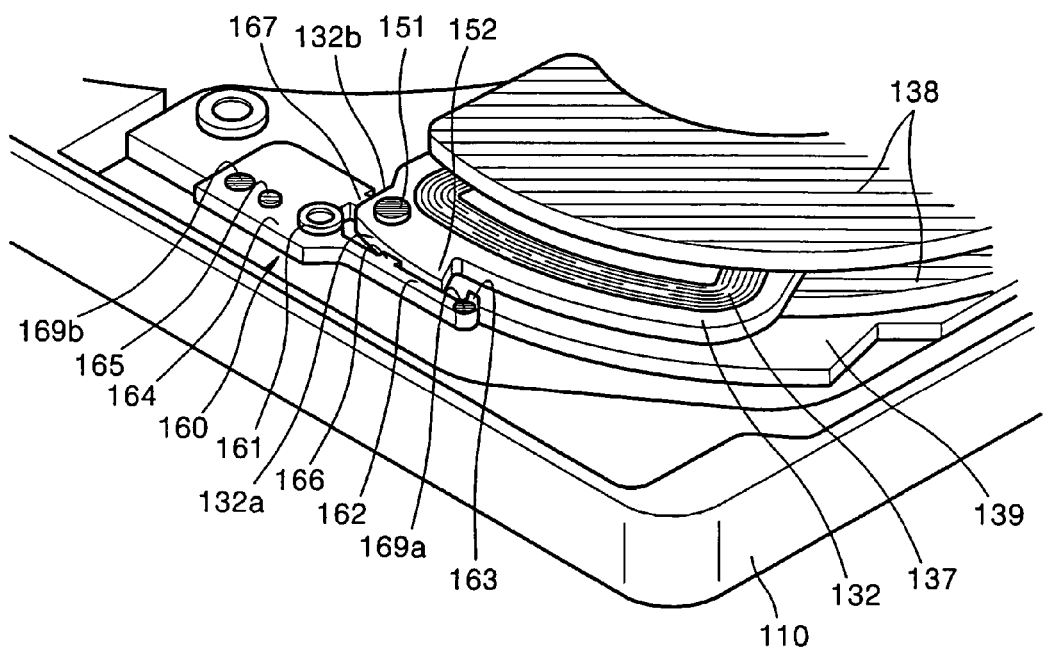
FIG. 4 is an enlarged perspective view of the actuator latch apparatus of FIG. 3.

FIG. 3 is a plan view of an HDD having an actuator latch apparatus according to an embodiment of the present invention, and FIG. 4 is an enlarged perspective view of the actuator latch apparatus of FIG. 3.

Referring to FIGS. 3 and 4, an HDD includes a disk 120 mounted on a spindle motor 112, and an actuator 130 moving a read/write head to a predetermined position on the disk 120. Here, the read/write head functions to read/write data from/to the disk 120. The actuator 130 includes: a swing arm 132 rotatably mounted on an actuator pivot 131 that is installed in a base member 110; a suspension 133 installed in a front end portion of the swing arm 132 to elastically bias a slider 134 toward a surface of the disk 120, wherein the head is mounted on the slider 134; and a voice coil motor (VCM) rotating the swing arm 132.

The VCM includes a VCM coil 137, which is coupled to a rear end portion of the swing arm 132, and a magnet 138, which is arranged at upper and lower portions of the VCM coil 137 and faces the VCM coil 137. The magnet 138 is attached to and supported by a yoke 139, which is fixed to the base member 110. The magnet 138 may be arranged at either or both of the upper and lower portions of the VCM coil 137. The VCM constructed as above is controlled by a servo control system. The VCM rotates the swing arm 132 in a direction based on Fleming's left hand rule by an interaction between a current inputted to the VCM coil 137 and magnetic field induced by the magnet 138. In other words, if the HDD is supplied with power and the disk 120 begins to rotate, the VCM rotates the swing arm 132 in a counterclockwise direction (arrow A), such that the head moves over a recording surface of the disk 120. On the other hand, if the power supplied to the disk drive is cut and the disk 120 is stopped, the VCM rotates the swing arm 132 in a clockwise direction (arrow B), such that the head move away from the disk 120.

After moving away from the recording surface of the disk 120, the head is parked on a ramp 140, which is provided at an outside of the disk 120. Specifically, when the disk 120 is stopped, the VCM rotates the swing arm 132 in a direction indicated by an arrow B. Thus, an end-tap 135 that is positioned at an end portion of the suspension 133 is parked on the ramp 140.

The disk drive includes the actuator latch apparatus according to an embodiment of the present invention. When the operation of the disk drive is stopped, that is, the rotation of the disk 120 is stopped, the actuator latch apparatus locks the actuator 130 so that the head mounted on the actuator 130 can maintain the parked state. In other words, the actuator latch apparatus prevents the head from being moved from the ramp 140 toward the disk 120 due to a rotation of the actuator 130 that is caused by an impact when the rotation of the disk 120 is stopped. If the head moves over the disk 120 when the rotation of the disk 120 is stopped, the head directly contacts the surface of the disk 120, thus damaging the surface of the disk 120 and/or the head.

The actuator latch apparatus according to an embodiment of the present invention has a structure that can lock the actuator 130 using the inertia and the magnetic force of the magnet 138. In detail, the actuator latch apparatus illustrated in FIG. 3 includes a notch 152 positioned at a rear end portion of the swing arm 132, a latch lever 160 rotatably installed on the base member 110, and first and second cores 151 and 165 respectively provided at the swing arm 132 and the latch lever 160.

Since the VCM coil 137 is coupled to the rear end portion of the swing arm 132, according to one embodiment, the rear end portion of the swing arm 132 is made using a plastic injection molding. The notch 152 positioned at the rear end portion of the swing arm 132 may be formed to be protruded horizontally from the rear end portion of the swing arm 132 by a plastic injection molding.

The latch lever 160 includes a latch pivot 161 installed in the base member 110, a latch arm 162 provided at a first side of the latch pivot 161, and a counterbalance 164 provided at a second side of the latch pivot 161. A hook 163 is provided at a front end portion of the latch arm 162. When the actuator 130 is locked, the hook 163 is caught by the notch 152. When a clockwise or counterclockwise rotational impact force is applied to the disk drive, an inertia to the clockwise or counterclockwise direction, respectively, is created in the latch lever 160. Due to such an inertia, the hook 163 of the latch arm 162 is caught by the notch 152 of the swing arm 132, thereby preventing the arbitrary rotation of the swing arm 132.

Specifically, the latch arm 162 of the latch lever 160 is elastically deformed when contacted by the swing arm 132, during parking of the head, the swing arm 132 rotating in a clockwise direction for the parking of the head, thus reducing an impact force due to the contact with the swing arm 132. For this purpose, according to one embodiment, the latch arm 162 is made of an elastic material, for example plastic material such as polyimide, acting as a spring. It is preferable that the latch arm 162 is so thin as to be bent due to the contact with the swing arm 132. A thickness of the latch arm 162 can be appropriately determined to have a proper flexibility, considering the stiffness of a material comprising the latch arm 162. For example, when the latch arm 162 is formed of a high-stiffness material, the latch arm 162 is formed so thin that elastic deformation can occur easily. On the other hand, in case when the latch arm 162 is formed of low-stiffness material, an elastic deformation of the latch arm 162 occurs easily even when the latch arm 162 is thick.

The latch arm 162 and the counterbalance 164 have a first protrusion 166 and a second protrusion 167, respectively. The first protrusion 166 protrudes from the latch arm 162 toward the swing arm 132, such that the first protrusion 166 comes into contact with a first side surface 132a of the swing arm 132, that is, a side surface that is approximately parallel to the rotational direction of the swing arm 132. The second protrusion 167 protrudes from the counterbalance 164 toward the swing arm 132, such that the second protrusion 167 contacts with a second side surface 132b of the swing arm 132, that is, a side surface that is approximately perpendicular to the rotational direction of the swing arm 132. The first and second protrusions 166 and 167 decrease a contact area between the latch lever 160 and the swing arm 132, thus reducing the generation of particles.

The first core 151 is arranged at one corner portion in a rear portion of the swing arm 132. According to one embodiment, the first core 151 is a of magnetic substance, preferably a ferromagnetic substance, such as steel, so that a magnetic force can operate between the first core 151 and the magnet 138. The first core 151 applies a clockwise torque to the swing arm 132. In detail, the magnetic force of the magnet 138 acts on the first core 151. Accordingly, a clockwise torque is applied to the swing arm 132 due to the magnetic force, which directs from the first core 151 to the magnet 138. The torque applied to the swing arm 132 in a clockwise direction causes the actuator 130 to be locked when a relatively weak rotational impact force or a vibration occurs.

The second core 165 is arranged at the counterbalance 164 of the latch lever 160. According to one embodiment, the second core 165 is of a magnetic substance, preferably a ferromagnetic substance, such as steel, so that a magnetic force can act on the second core 165 from the magnet 138. The second core 165 applies a clockwise torque to the latch lever 160. In detail, the magnetic force of the magnet 138 acts on the second core 165. Accordingly, a clockwise torque is applied to the latch lever 160 due to the magnetic force, which directs from the second core 165 to the magnet 138.

If a size of the first core 151 is larger than that of the second core 165, a magnitude of the torque acting on the swing arm 132 becomes larger than that of the torque operating in the latch lever 160, thus maintaining the locked state of the actuator 130 stably.

The latch arm 162 and the counterbalance 164 include first and second weights 169a and 169b, respectively. The first weight 169a is installed in a front end portion of the latch arm 162, that is, close to the hook 163. The second weight 169b is installed in a rear end portion of the counterbalance 164. The weight balance of the latch arm 162 and the counterbalance 164 can be kept by adjusting the respective sizes of the first and second weights 169a and 169b. Thus, an inertia applied to the latch lever 160 can be controlled.

According to one embodiment, the actuator latch apparatus includes a latch stop that limits the clockwise rotation of the latch lever 160. In this embodiment, the sidewall of the base member 110 acts as the latch stop.

An operation of the actuator latch apparatus will now be described with reference to FIGS. 5A through 5C.

Figure 5A:
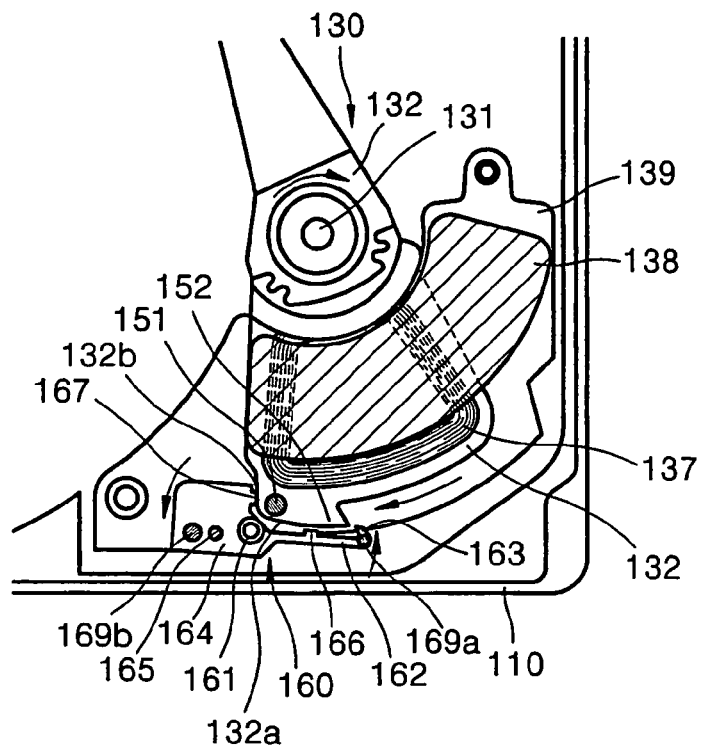
FIGS. 5A through 5C illustrate an operation of the actuator latch apparatus of FIG. 3.
Figure 5B:
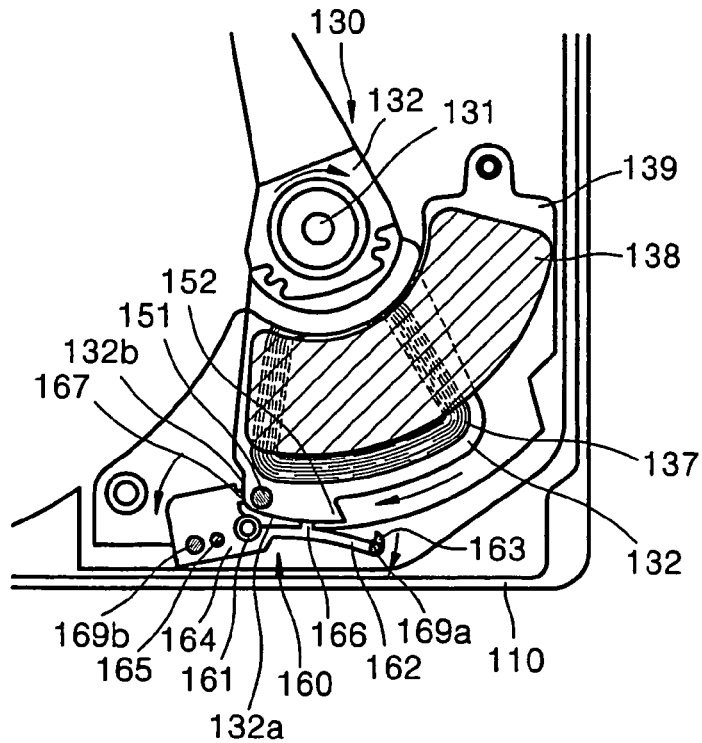
Figure 5C:
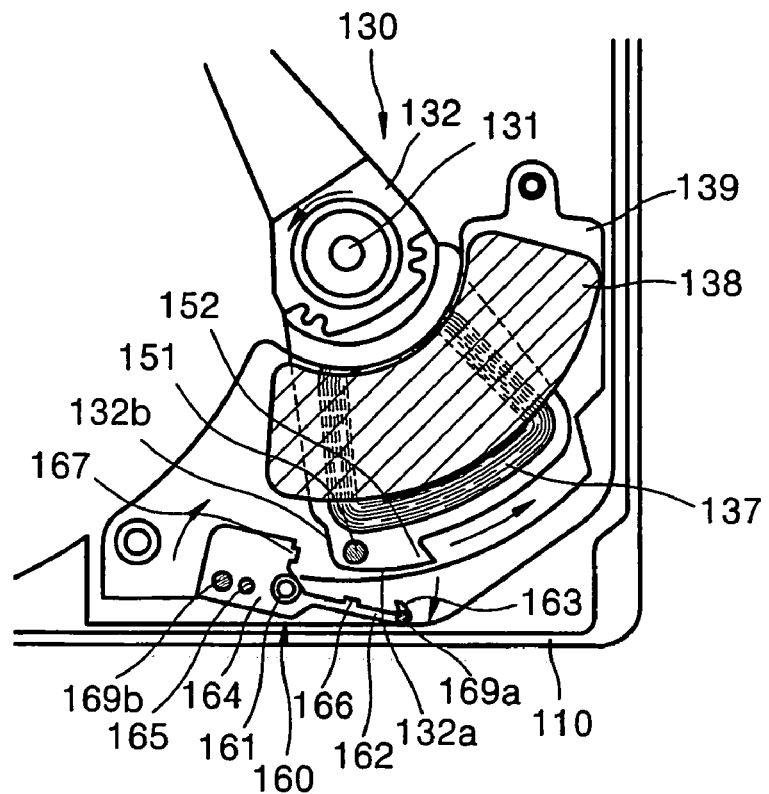

FIG. 5A illustrates an actuator locking operation of the actuator latch apparatus, FIG. 5B illustrates a damping operation of the latch lever in the actuator locking operation, and FIG. 5C illustrates an unlocking operation of the actuator latch apparatus.

Referring to FIG. 5A, when the operation of the disk drive is stopped and the head is parked in the ramp 140, the VCM rotates the swing arm 132 around the actuator pivot 131 in a clockwise direction. At this point, the second side surface 132b of the swing arm 132 is in contact with the second protrusion 167 provided on the counterbalance 164 of the latch lever 160. Thus, the latch lever 160 is pushed by the swing arm 132, which rotates in a clockwise direction, so that the latch level 160 rotates in a counterclockwise direction.

Referring to FIG. 5B, if the swing arm 132 keeps on rotating in a clockwise direction, the first protrusion 166, provided at the latch arm 162 of the latch lever 160 rotating in a counterclockwise direction, contacts the first side surface 132a of the swing arm 132. Thus, the latch arm 162 is elastically deformed and bent. At this time, due to a spring operation of the latch arm 162, a force of an impact between the swing arm 132 and the latch lever 160 is reduced.

As the clockwise rotation of the swing arm 132 is stopped, the elastically deformed latch arm 162 is resilient, and resumes the latch arm's 162 original shape. Accordingly, as is shown in FIG. 3, the latch lever 160 is in a parked position, and the parking of the head is finished. Simultaneously, the locking of the actuator 130 is accomplished. At this point, even if the rotational driving force applied to the swing arm 132 by the VCM is removed, the locking state of the actuator 130 can be maintained due to the clockwise torque, which is applied to the swing arm 132 by the first core 151 and the magnet 138. As described above, the torque that is larger than the torque acting on the latch lever 160 acts on the swing arm 132, thus maintaining the locking state of the actuator 130 more stably.

Meanwhile, when the head is parked, if a clockwise rotational impact force greater than the torque applied to the swing arm 132 by the first core 151 and the magnet 138 is applied to the HDD, the swing arm 132 and the latch lever 160 rotate in a counterclockwise direction due to inertia. Thus, the hook 163 of the latch arm 162 is caught by the notch 152, such that the swing arm 132 cannot rotate further.

On the other hand, if a counterclockwise rotational impact force is applied to the disk drive, a clockwise inertia acts on the swing arm 132 and the latch lever 160. Thus, the swing arm 132 and the latch lever 160 collide with each other and rebound, such that the swing arm 132 and the latch lever 160 rotate in a counterclockwise direction. But, as shown in FIG. 3, the swing arm 132 and the latch lever 160 are in contact with each other, so that the counterclockwise torque of the swing arm 132 due to the rebound is weak. Therefore, the counterclockwise rotation of the swing arm 132 does not occur due to the magnetic force acting on the first core 151 from the magnet 138.

In case an external impact force less than the torque applied to the swing arm 132 by the first core 151 and the magnet 138 is applied to the HDD, the rotation of the swing arm 62 does not occur, such that the locking state of the actuator 130 is maintained.

In this manner, the actuator latch apparatus uses the magnetic force and the inertia in combination, so that the actuator 130 is reliably locked in a relatively weak impact as well as a strong impact. Specifically, an impact between the swing arm 132 and the latch lever 160 is reduced due to a spring operation of the latch arm 162, such that the amount of noise generated by the impact is reduced. Also, it is possible to prevent damage of the head and the degradation of the read/write performance, which are caused by transferring the impact to the head. Further, it is possible to reduce abrasion of the swing arm 132 and the latch lever 160 and reduce the generation of particles.

Referring to FIG. 5C, if power is supplied to the VCM coil 137 to operate the HDD, the swing arm 132 rotates in a counterclockwise direction while overcoming the clockwise torque. At the same time, the latch lever 160 rotates in a clockwise direction due to the clockwise torque applied by the second core 165 and the magnet 138, such that the hook 163 of the latch lever 160 does not interfere with the notch 152 of the swing arm 132. The clockwise rotation of the latch lever 160 is limited by the sidewall of the base member 110, which acts as the latch stop.

Figure 6:
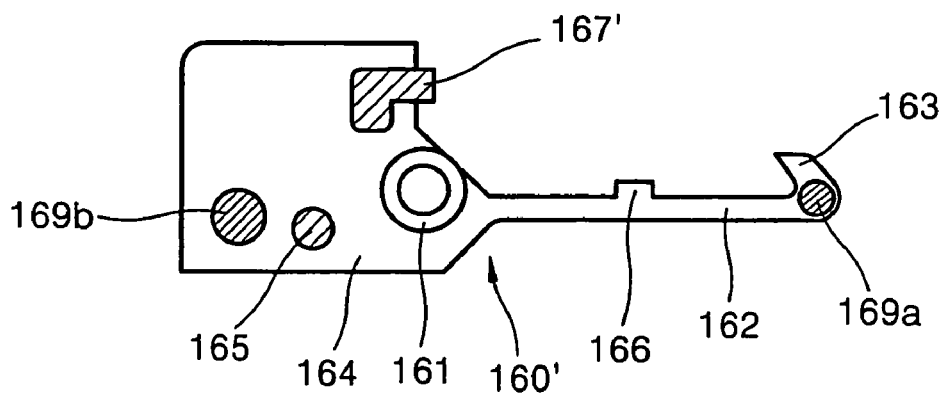
FIG. 6 is a plan view illustrating a modification of a latch lever of FIG. 3.

FIG. 6 is a plan view illustrating a modification of the latch lever shown in FIG. 3.

A structure of the latch lever 160' shown FIG. 6 is identical to that of the latch lever 160 according to the first embodiment, except for a second protrusion 167'. The second protrusion 167' is provided at a counterbalance 164 of the latch lever 160' and is made of a visco-elastic material, such as rubber. A portion of the second protrusion 167' is insertedly coupled to the counterbalance 164. The second protrusion 167' and the counterbalance 164 may be coupled by an insert molding. Also, according to one embodiment, a width of a portion inserted into the counterbalance 164 is larger than that of a portion protruded from the counterbalance 164. Due to such a configuration, the second protrusion 167' and the counterbalance 164 are coupled more firmly.

If the second protrusion 167' is made of a visco-elastic material with an excellent buffering characteristic, a force of an impact caused by the contact between the second protrusion 167' and the swing arm 132 can be reduced more effectively.

Figure 7:
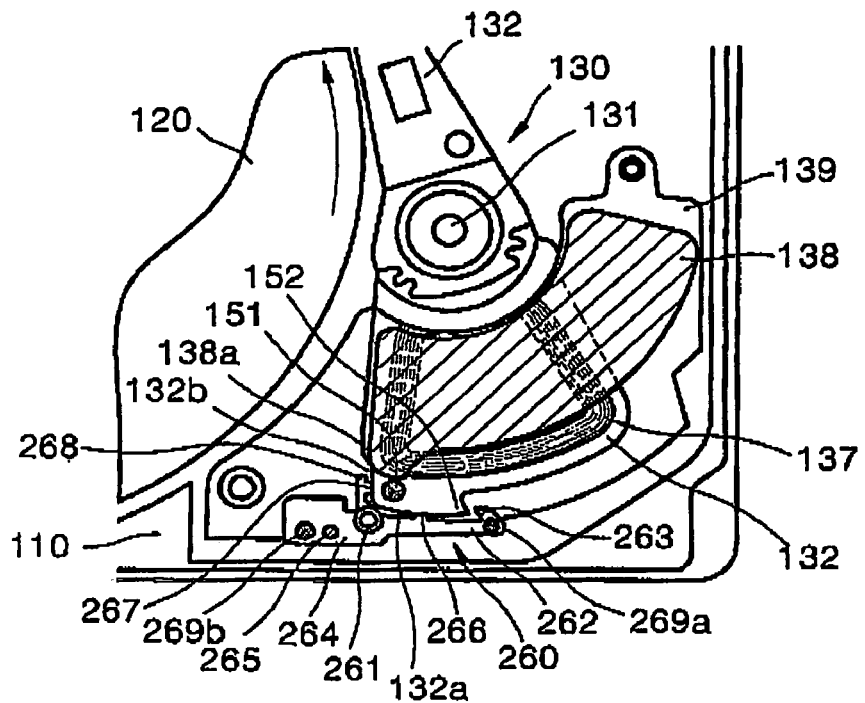
FIG. 7 is a partial plan view of a disk drive having an actuator latch apparatus according to another embodiment of the present invention.

FIG. 7 is a partial plan view of a disk drive having an actuator latch apparatus according to another embodiment of the present invention.

Referring to FIG. 7, an actuator latch apparatus according to another embodiment of the present invention includes the notch 152 positioned at a rear end portion of the swing arm 132, a latch lever 260 rotatably installed in the base member 110, and first and second cores 151 and 265, respectively provided on the swing arm 132 and the latch lever 260.

In this embodiment, the latch lever 260 includes a latch pivot 261 installed in the base member 110, a latch arm 262 provided at a first side of the latch pivot 261, a counterbalance 264 provided at a second side of the latch pivot 261, and a damping arm 268 that has a predetermined length and is protruded from a portion between the latch arm 262 and the counterbalance 264. The latch arm 262 has a hook 263 that is caught by the notch 152 when the actuator 130 is locked. The latch lever 260 functions to prevent the swing arm 132 from rotating arbitrarily due to an inertia that is generated by a rotational impact force applied to the HDD.

In this embodiment, the damping arm 268 of the latch lever 260 may elastically deform when contacted by the swing arm 132, which rotates in one direction for the parking of the head, thus reducing a force of an impact due to the contact with the swing arm 132. For this purpose, According to one embodiment, the damping arm 268 is an elastic material, for example, a plastic material, such as polyimide, acting as a spring. It is preferable that the damping arm 268 is so thin as to be easily bent due to the contact with the swing arm 132. A thickness of the damping arm 268 can be appropriately determined to have a proper flexibility, considering the stiffness of the material comprising the damping arm 268. Further, since the damping arm 268 executes a damping operation, limitations in kinds or thickness of a material regarding the latch arm 162 are not applied to the latch arm 262. In other words, the latch arm 262 may be relatively thick to have a sufficient stiffness.

To reduce a contact area between the latch lever 260 and the swing arm 132, the latch arm 262 and the damping arm 268 have a first protrusion 266 and a second protrusion 267, respectively. The first protrusion 266 is protrudes from the latch arm 262 toward the swing arm 132, such that it comes into contact with the first side surface 132a of the swing arm 132. The second protrusion 267 protrudes from the damping arm 268 toward the swing arm 132, such that it comes into contact with the second side surface 132b of the swing arm 132. Since a construction and operation of first and second cores 151 and 265 are identical to those of the previously described embodiment, their detailed description will be omitted.

Like the previously described embodiment, the latch arm 262 and the counterbalance 264 may include first and second weights 269a and 269b, respectively.

Meanwhile, a protrusion 138a is positioned to protrude toward the latch lever 260 at an edge portion of the magnet 138. Due to the protrusion 138a, a distance between the magnet 138 and the first core 151 and a distance between the magnet 138 and the second core 265 become closer. Therefore, the magnetic force of the magnet 138 acting on the first core 151 and second core 265 is stronger, such that a larger torque is applied to the swing arm 132 and the latch lever 260. Thus, the actuator 130 can be locked more stably against a relatively weak impact force and vibration.

Also, the protrusion 138a provided at the magnet 138 can be applied to the previously described embodiment and yet another embodiment, which will be described later.

An operation of the actuator latch apparatus will now be described with reference to FIG. 8.

Figure 8:
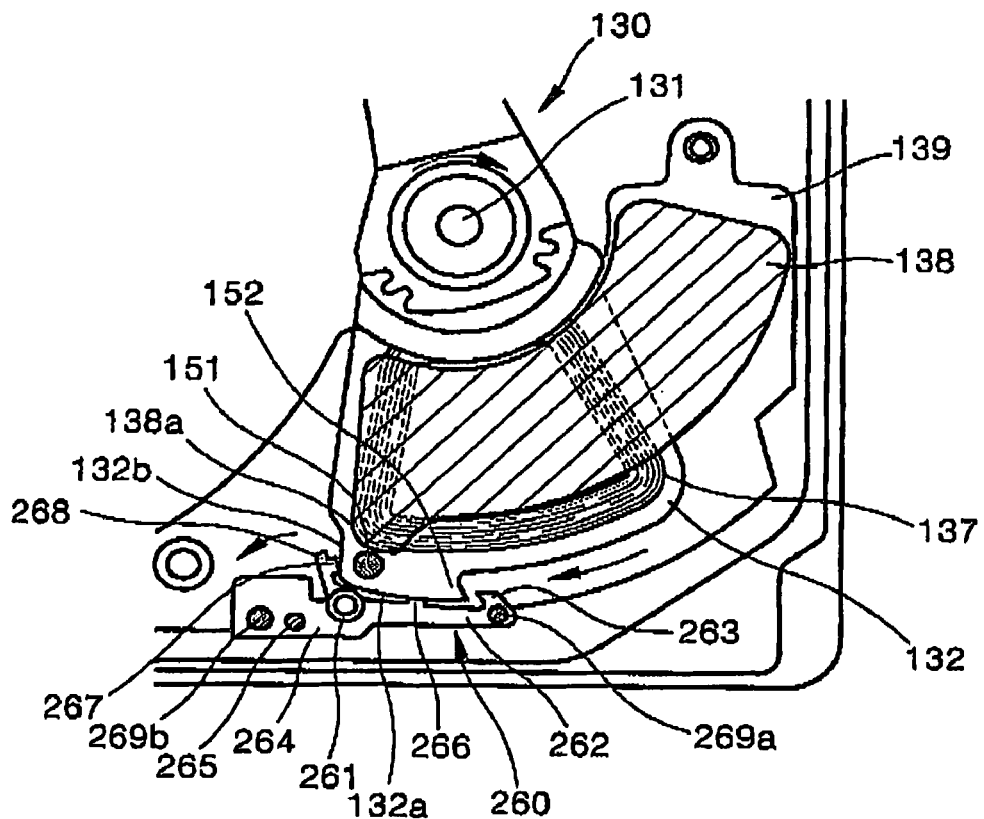
FIG. 8 illustrates an operation of the actuator latch apparatus of FIG. 7.

FIG. 8 illustrates an actuator damping operation of the latch lever 260 in the locking operation of the actuator 130.

Since the actuator locking and unlocking operations of the actuator latch apparatus are identical to those of the previously described embodiment, their detailed description will be omitted.

Referring to FIG. 8, if the swing arm 132 rotates in a clockwise direction for the parking of the head, the second side surface 132b of the swing arm 132 contacts the second protrusion 267 of the damping arm 268, such that the latch lever 260 rotates in a counterclockwise direction. If the swing arm 132 rotates further in a clockwise direction, the first protrusion 266 provided at the latch arm 262 contacts the first side surface 132a of the swing arm 132. Thus, the damping arm 268 is elastically deformed and bent. At this time, due to a spring operation of the damping arm 268, an impact between the swing arm 132 and the latch lever 260 is reduced.

If the clockwise rotation of the swing arm 132 is stopped, the elastically deformed latch arm 162 is resilient. Accordingly, the parking of the head is finished and the locking of the actuator 130 is accomplished. At this point, the locking state of the actuator 130 can be maintained due to the clockwise torque that is applied to the swing arm 132 by the first core 151 and the magnet 138.

Meanwhile, similar to the previously described embodiment, in such a state that the head is parked, if a rotational impact force is applied to the HDD, the latch lever 260 rotates due to an inertia, and thus an undesired operation of the swing arm 132 is limited.

Figure 9:
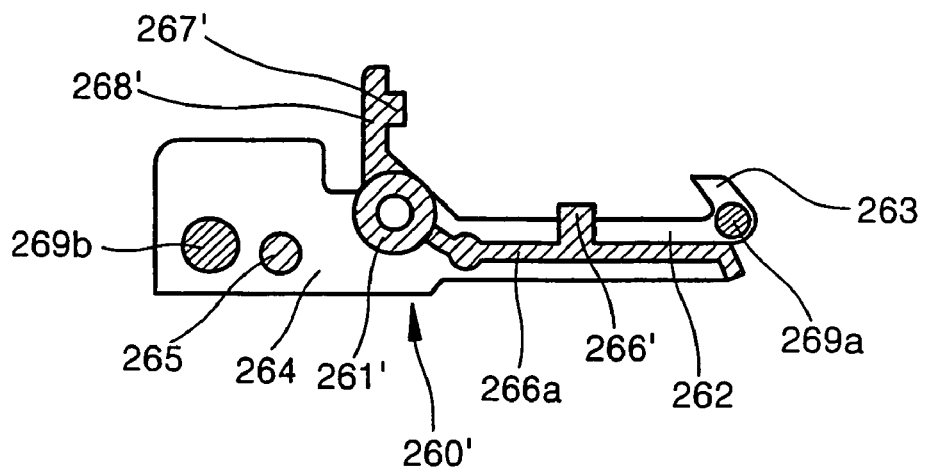
FIG. 9 is a plan view illustrating a modification of a latch lever of FIG. 7.

FIG. 9 is a plan view illustrating a modification of the latch lever shown in FIG. 7.

In the latch lever 260' of FIG. 9, a first protrusion 266', a second protrusion 267' and a damping arm 268' are made of a visco-elastic material, such as rubber.

The first protrusion 266' is insertedly coupled to the latch arm 262. To couple the first protrusion 266' with the latch arm 262 more firmly, a supporter 266a supporting the first protrusion 266' is coupled to the latch arm 262. The supporter 266a is formed integrally with the first protrusion 266', and is positioned elongatedly in a length direction of the latch arm 262.

According to one embodiment, the second protrusion 267' is formed integrally with the damping arm 268'. According to another embodiment, the latch pivot 261' is made of visco-elastic material. In this case, the latch pivot 261' and the damping arm 268' may be formed integrally.

Due to the elements being made of a visco-elastic material that has excellent damping characteristics, an impact resulting from the contact between the latch lever 260' and the swing arm 132 can be reduced more efficiently.

Figure 10:
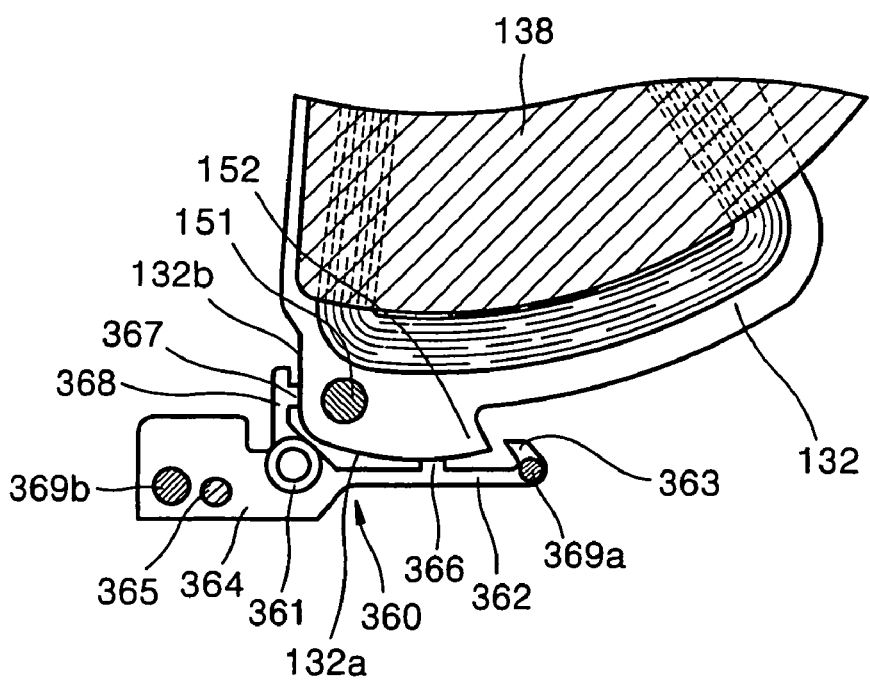
FIG. 10 is a partial plan view of a disk drive having an actuator latch apparatus according to yet another embodiment of the present invention.

FIG. 10 is a partial plan view of an HDD having an actuator latch apparatus according to yet another embodiment of the present invention.

Referring to FIG. 10, an actuator latch apparatus has a structure in which the characteristics of the previously described embodiments are combined. The actuator latch apparatus includes the notch 152 positioned at the rear end portion of the swing arm 132, a latch lever 360 rotatably installed in the base member 110, and first and second cores 151 and 365 respectively provided at the swing arm 132 and the latch lever 360. In this embodiment, the latch lever 360 includes a latch pivot 361 installed in the base member 110, a latch arm 362 provided at a first side of the latch pivot 361, a counterbalance 364 provided at a second side of the latch pivot 361, and a damping arm 368 that has a predetermined length and protrudes from a portion between the latch arm 362 and the counterbalance 364. The latch arm 362 has a hook 363 that is caught by the notch 152 when the actuator 130 is locked.

In this embodiment, the latch arm 362 and the damping arm 368 are elastically deformed when contacted by the swing arm 132 during parking, the swing arm 132 rotating in one direction for the parking of the head, thus reducing a force of an impact due to the contact with the swing arm 132. In other words, the latch arm 362 is elastically deformed in contact with the first side surface 132a of the swing arm 132, and the damping arm 368 is elastically deformed when contacted by the second side surface 132b of the swing arm 132. For this purpose, the latch arm 362 and the damping arm 368 are made of an elastic material acting as a spring, for example, a plastic material, such as polyimide. It is preferable that the latch arm 362 and the damping arm 368 are so thin as to be easily bent due to the contact with the swing arm 132.

In the actuator latch apparatus of FIG. 10, the latch arm 362 and the damping arm 368 operate as a spring, such that an impact generated between the latch lever 360 and the swing arm 132 is reduced effectively.

The latch arm 362 and the damping arm 368 have first and second protrusions 366 and 367, respectively. Also, the second protrusion 367, the damping arm 368 and the latch pivot 361 are made of a visco-elastic material and are integrally formed.

Since a construction and operation of the first and second cores 151 and 365 are identical to those of the above-described embodiments, their detailed description will be omitted. Like the above-described embodiments, the latch arm 362 and the counterbalance 364 have first and second weights 369a and 369b, respectively.

Figure 2A:
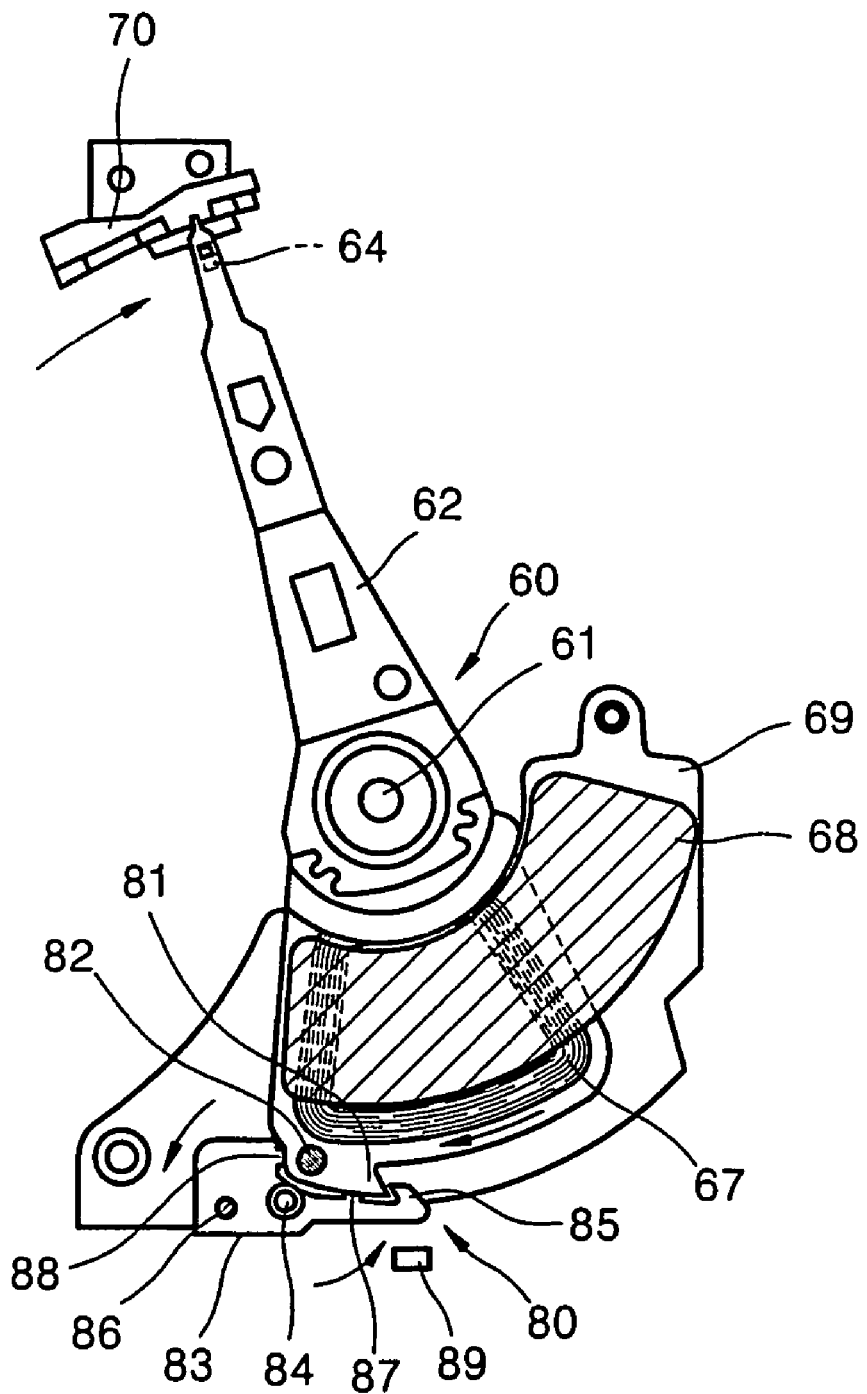
FIGS. 2A and 2B show another example of a prior art actuator latch apparatus for an HDD.
Figure 2B:
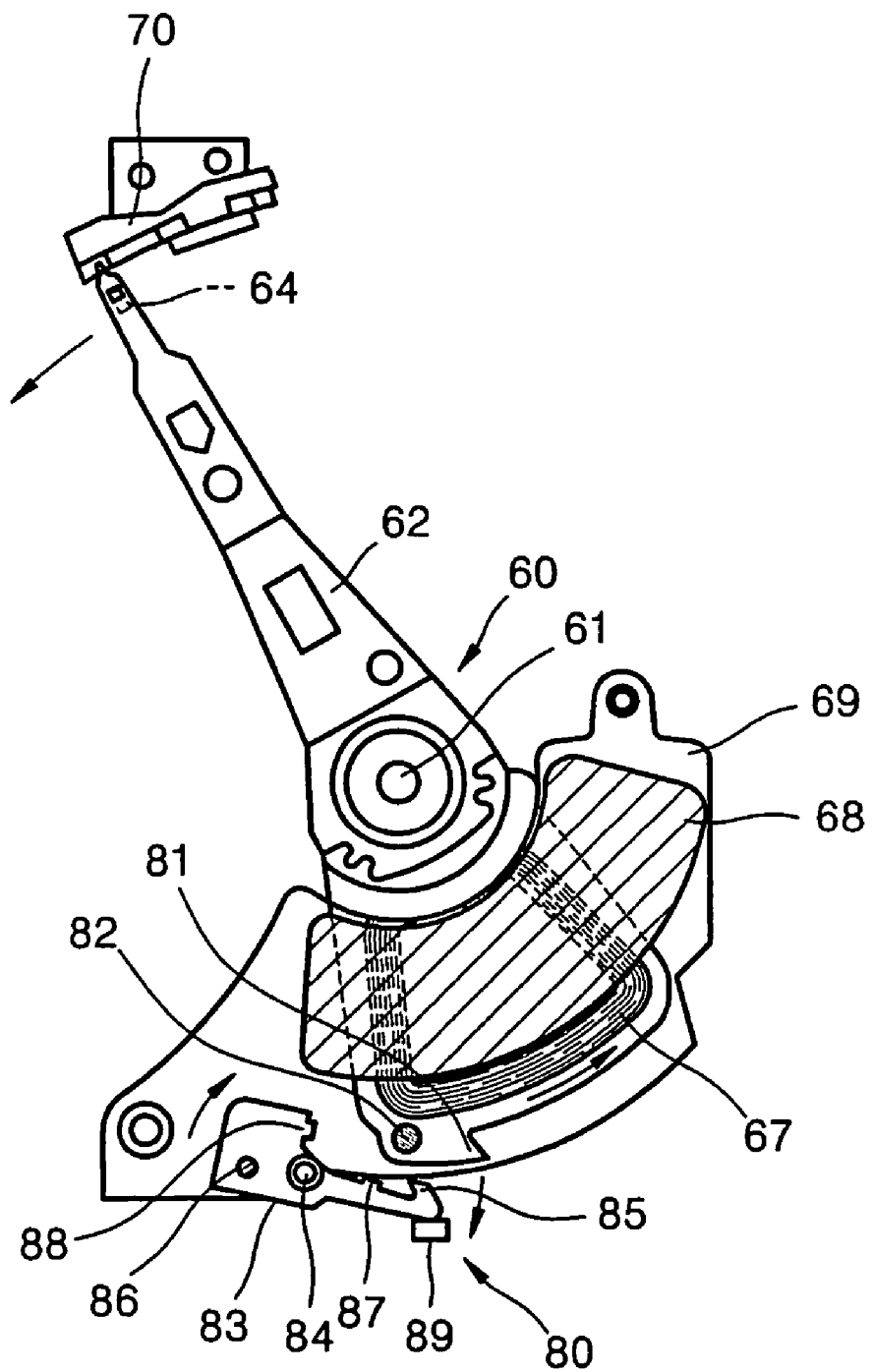
Figure 11:
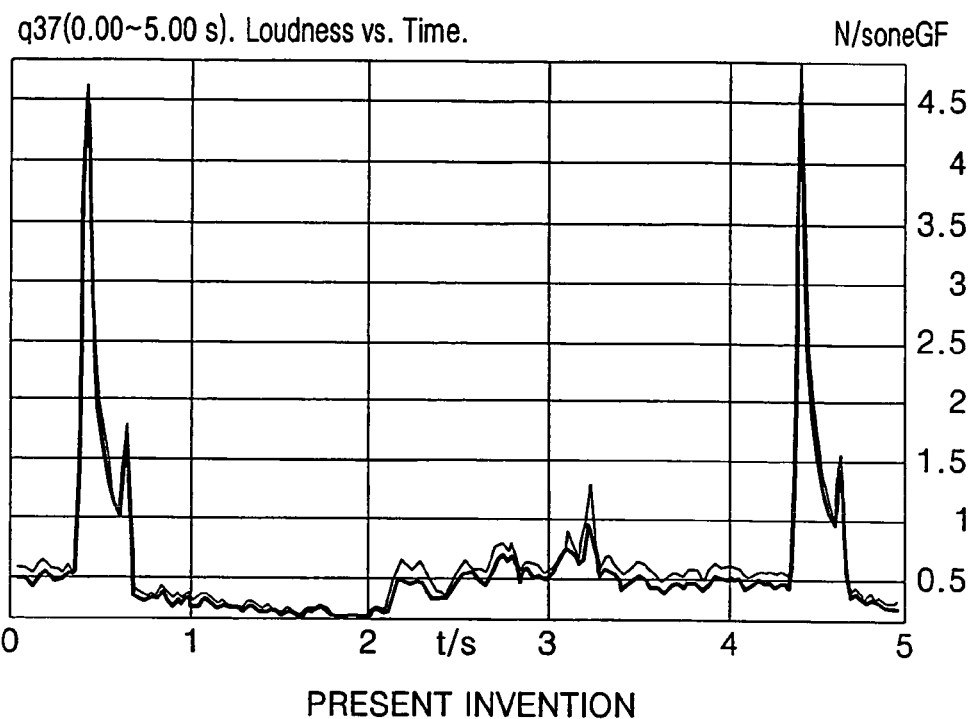
FIG. 11 illustrates a comparison of noises generated during a parking of a head using an HDD according to the prior art, and an HDD according to an embodiment of the present invention.
Figure 11:
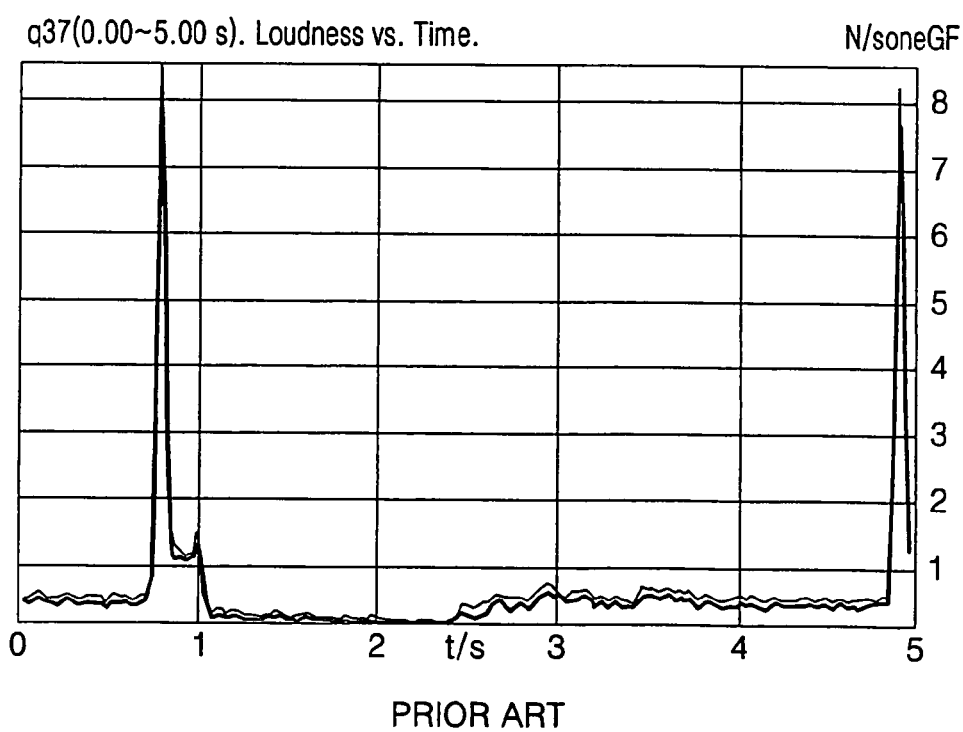

FIG. 11 shows a graph illustrating a comparison of noises generated during the parking of a head according to the prior art and an embodiment of the present invention. An upper graph is a result of a noise measurement when the head is parked by the actuator latch apparatus of FIG. 7, and a lower graph is a result of a noise measurement when the head is parked by the actuator latch apparatus of FIGS. 2A and 2B according to the prior art.

Referring to FIG. 11, when the head is parked, the noise due to the actuator latch actuator apparatus according to the embodiment of the present invention is about 4.5 sone, while the noise due to the actuator latch apparatus according to the prior art is about 8.5 sone. According to the embodiment of the present invention, since the force of the impact between the latch lever and the swing arm is reduced, the noise generated by the impact is reduced by about 50% compared with the prior art.

Further, it is possible to prevent the damage of the head and the degradation of the read/write performance, which are caused by transferring the impact to the head. Furthermore, it is possible to prevent the amount of abrasion of the swing arm and the latch lever and the generation of particles, which are caused by the impact.

The present invention can be applied to CSS disk drives, as well as ramp loading disk drives.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator latch apparatus to lock and unlock an actuator in a disk drive, to maintain a read/write head in a parking zone when the disk drive is stopped, the disk drive having the actuator including a swing arm rotatably mounted on a base member, a VCM coil coupled to one end portion of the swing arm, and a magnet arranged to face the VCM coil, the actuator latch apparatus comprising:
   a notch positioned at one end portion of the swing arm;
   a latch lever rotatably installed in the base member, the latch lever including
      a latch pivot,
      a latch arm that is provided at a first side of the latch pivot and has a hook to be caught by the notch when the actuator is locked,
      a counterbalance provided at a second side of the latch pivot, and
      a damping arm protruding from a portion between the latch arm and the counterbalance;
   a first core provided at a first end portion of the swing arm to apply a torque to the swing arm in a first direction by a magnetic force of the magnet; and
   a second core provided at the counterbalance of the latch lever to apply a torque to the latch lever in the first direction by a magnetic force of the magnet,
   wherein the damping arm of the latch lever is deformed elastically when contacted by the swing arm during parking of the head, the swing arm rotating in the first direction when the head is parked, such that an impact due to a contact with the swing arm is reduced.

2. The actuator latch apparatus of claim 1, wherein the damping arm is made of an elastic material.

3. The actuator latch apparatus of claim 1, wherein the damping arm is sufficiently thin so as to be bent due to a contact with the swing arm during parking of the head.

4. The actuator latch apparatus of claim 1, wherein:
   the latch arm includes a first protrusion protruding toward the swing arm to contact with a first side surface of the swing arm; and
   the damping arm includes a second protrusion protruding toward the swing arm to contact with a second side surface of the swing arm.

5. The actuator latch apparatus of claim 4, wherein:
   the first protrusion, the second protrusion and the damping arm are made of a visco-elastic material;
   the first protrusion is insertedly coupled to the latch arm; and
   the second protrusion and the damping arm are integrally formed.

6. The actuator latch apparatus of claim 5, wherein the latch pivot is made of visco-elastic material and is formed integrally with the damping arm.

7. The actuator latch apparatus of claim 5, wherein the latch arm further includes a supporter supporting the first protrusion, the supporter being formed integrally with the first protrusion and elongated in a length direction.

8. The actuator latch apparatus of claim 1, further comprising weights that are respectively installed in the latch arm and the counterbalance, to control an inertia of the latch lever.

9. The actuator latch apparatus of claim 1, wherein the first core has a greater size than the second core.

10. An actuator latch apparatus to lock and unlock an actuator in a disk drive, to maintain a read/write head in a parking zone when the disk drive is stopped, the disk drive having the actuator including a swing arm rotatably mounted on a base member, a VCM coil coupled to one end portion of the swing arm, and a magnet arranged to face the VCM coil, the actuator latch apparatus comprising:
    a notch positioned at one end portion of the swing arm;
    a latch lever rotatably installed in the base member, the latch lever including
       a latch pivot,
       a latch arm that is provided at a first side of the latch pivot and has a hook to be caught by the notch when the actuator is locked,
       a counterbalance provided at a second side of the latch pivot, and
       a damping arm protruding from a portion between the latch arm and the counterbalance;
    a first core provided at a first end portion of the swing arm to apply a torque to the swing arm in a first direction by a magnetic force of the magnet; and
    a second core provided at the counterbalance of the latch lever to apply a torque to the latch lever in the first direction by a magnetic force of the magnet,
    wherein the latch arm and the damping arm are respectively deformed elastically when respectively contacted by first and second side surfaces of the swing arm during parking of the head, the swing arm rotating in the first direction when the head is parked, such that an impact due to a contact with the swing arm is reduced.

11. The actuator latch apparatus of claim 10, wherein the latch arm and the damping arm are made of an elastic material.

12. The actuator latch apparatus of claim 10, wherein the latch arm and the damping arm are sufficiently thin to be bent due to a contact with the swing arm during parking of the head.

13. The actuator latch apparatus of claim 10, wherein:
    the latch arm includes a first protrusion protruding toward the swing arm to contact with the first side surface of the swing arm; and
    the damping arm includes a second protrusion protruding toward the swing arm to contact with the second side surface of the swing arm.

14. The actuator latch apparatus of claim 13, wherein the second protrusion and the damping arm are made of a visco-elastic material, and the second protrusion and the damping arm are integrally formed.

15. The actuator latch apparatus of claim 14, wherein the latch pivot is made of a visco-elastic material and is formed integrally with the damping arm.

16. The actuator latch apparatus of claim 10, further comprising weights that are respectively installed in the latch arm and the counterbalance, to control an inertia of the latch lever.

17. The actuator latch apparatus of claim 10, wherein the first core has a greater size than the second core.

18. The actuator latch apparatus of claim 10, wherein the magnet further comprises a protrusion protruding toward the latch lever at an edge portion of the magnet.

19. An actuator latch apparatus to maintain a read/write head of a disk drive in a parking zone, the head being mounted on a swing arm at a first end thereof, and the disk drive having a magnet disposed to face a VCM coil positioned at a second end of the swing arm, the actuator latch apparatus comprising:
    a notch positioned at the second end of the swing arm;
    a latch lever rotatably installed on a base of the disk drive, the latch lever comprising
       a latch pivot, a latch arm extending from a first portion of the latch pivot, and having a hook shaped to engage the notch and prevent the head mounted on the swing arm from leaving the parking zone when the head is parked, a counterbalance extending from a second portion of the latch pivot, a first protrusion protruding from the latch arm to contact a first side surface of the swing arm during head parking, and a second protrusion to contact a second side surface of the swing arm during head parking;

a damping arm protruding from the latch lever between the latch arm and the counterbalance, and housing the second protrusion, and deforming elastically when the second protrusion is contacted by the swing arm during head parking;

a first magnetic core disposed at the second end of the swing arm to apply a torque, due to a magnetic force of the magnet, to the swing arm in a first direction; and a second magnetic core disposed at the counterbalance to apply a torque, due to the magnetic force of the magnet, to the latch lever in the first direction, wherein at least one portion of the latch lever deforms elastically when contacted by the swing arm during head parking.

20. The apparatus according to claim 19, wherein the first protrusion, the second protrusion, and the damping arm are made of a visco-elastic material.

21. The apparatus according to claim 20, wherein the latch lever further comprises:

a supporter made of the visco-elastic material and integrally formed with the first protrusion, wherein the supporter and the first protrusion are insertedly coupled with the latch arm.

22. The apparatus according to claim 20, wherein the second protrusion is integrally formed with the damping arm.

23. The apparatus according to claim 20, wherein:

the latch pivot is made of the visco-elastic material; and
the latch pivot and the damping arm are integrally formed.

24. The apparatus according to claim 20, wherein:

the latch pivot is made of the visco-elastic material; and
the latch pivot, the second protrusion, and the damping arm are integrally formed.

25. The apparatus according to claim 20, wherein the visco-elastic material is polyimide.

26. An actuator latch apparatus to maintain a read/write head of a disk drive in a parking zone, the head being mounted on a swing arm at a first end thereof, and the disk drive having a magnet disposed to face a VCM coil positioned at a second end of the swing arm, the actuator latch apparatus comprising:

a notch positioned at the second end of the swing arm;

a latch lever rotatably installed on a base of the disk drive, the latch lever comprising a latch pivot, a latch arm extending from a first portion of the latch pivot, and having a hook shaped to engage the notch and prevent the head mounted on the swing arm from leaving the parking zone when the head is parked, a counterbalance extending from a second portion of the latch pivot, a first protrusion protruding from the latch arm to contact a first side surface of the swing arm during head parking, and a second protrusion to contact a second side surface of the swing arm during head parking;

a damping arm protruding from the latch lever between the latch arm and the counterbalance and housing the second protrusion, and deforming elastically when the second protrusion is contacted by the swing arm during head parking;

a first magnetic core disposed at the second end of the swing arm to apply a torque, due to a magnetic force of the magnet, to the swing arm in a first direction; and a second magnetic core disposed at the counterbalance to apply a torque, due to the magnetic force of the magnet, to the latch lever in the first direction, wherein at least one portion of the latch lever deforms elastically when contacted by the swing arm during head parking and the latch arm is sufficiently thin to deform elastically when the first protrusion is contacted by the swing arm during head parking.

27. The apparatus according to claim 26, wherein the latch arm and the damping arm are made of an elastic material.

28. The apparatus according to claim 27, wherein the elastic material is polyimide.

* * * * *